United States Patent [19]

Konrad et al.

[11] Patent Number: 4,727,124
[45] Date of Patent: Feb. 23, 1988

[54] PREPARATION OF HOMOPOLYMERS AND COPOLYMERS OF ETHENE BY PHILLIPS CATALYSIS

[75] Inventors: Rainer Konrad, Goennheim; Rudolf Mueller-Mall, Neuhofen; Guenther Schweier, Friedelsheim, all of Fed. Rep. of Germany

[73] Assignee: BASF Aktiengesellschaft, Ludwigshafen, Fed. Rep. of Germany

[21] Appl. No.: 47,116

[22] Filed: May 8, 1987

[30] Foreign Application Priority Data

May 30, 1986 [DE] Fed. Rep. of Germany ....... 3618259

[51] Int. Cl.$^4$ .......................... C08F 2/24; C08F 10/02
[52] U.S. Cl. .................................. 526/105; 502/113; 502/121; 526/106; 526/352
[58] Field of Search .................. 502/113; 526/105, 106

[56] References Cited

U.S. PATENT DOCUMENTS

| | | |
|---|---|---|
| 3,984,351 | 1/1976 | Rekers et al. |
| 3,985,676 | 1/1976 | Rekers et al. |
| 4,041,224 | 8/1977 | Hoff et al. ............................ 526/106 |
| 4,101,445 | 7/1978 | Levine et al. ........................ 526/106 |
| 4,328,124 | 5/1982 | Speca et al. |
| 4,368,302 | 1/1983 | Downs . |
| 4,404,340 | 9/1983 | Speca et al. |

FOREIGN PATENT DOCUMENTS

| | | |
|---|---|---|
| 1391771 | 4/1975 | United Kingdom . |
| 2073761 | 10/1981 | United Kingdom ................ 526/105 |

*Primary Examiner*—Edward J. Smith

*Attorney, Agent, or Firm*—Keil & Weinkauf

[57] ABSTRACT

Ethane polymers are prepared by Phillips catalysis using (1) a supported catalyst which is laden with chromium, phosphorus and titanium and (2) a cocatalyst, (1) being obtained by a procedure in which (1.1) a catalyst intermediate laden with chromium, phosphorus and titanium is prepared from a silicate carrier, a selected chromium compound, a selected phosphorus compound and a selected titanium compound, and (1.2) the catalyst intermediate is then heated in an oxygen-containing gas stream. In the process, the supported catalyst (1) used is one which is obtained (using specific methods and substances in each case) by a procedure in which (1.1) in a first stage (1.1.1), a suspension is first prepared from (1.1.1.1) a finely divided silicate carrier and (1.1.1.2) an inert organic solvent, (1.1.2) a suspension is then prepared from (1.1.2.1) a finely divided chromium trioxide and (1.1.2.2) an inert organic solvent, (1.1.3) thereafter (1.1.3.1) the suspension resulting from (1.1.2) is combined with (1.1.3.2) a phosphate or phosphite, (1.1.4) then (1.1.4.1) the suspension obtained from (1.1.1) is combined with (1.1.4.2) the reaction product obtained in (1.1.3), (1.1.5) thereafter (1.1.5.1) the suspension formed in (1.1.4) is combined with (1.1.5.2) a titanate, (1.1.6) finally the suspension obtained in (1.1.5) is evaporated to dryness and then (1.2) in a second stage, (1.2.1) the intermediate obtained in (1.1) is first treated with a nitrogen stream, (1.2.2) an intermediate obtained in (1.2.1) is then heated in an oxygen-containing gas stream and finally (1.2.3) the intermediate obtained in (1.2.2) is treated with a nitrogen stream, and a lithiumalkyl is used as (2).

2 Claims, No Drawings

PREPARATION OF HOMOPOLYMERS AND COPOLYMERS OF ETHENE BY PHILLIPS CATALYSIS

The present invention relates to a process for the preparation of ethene homopolymers and ethene copolymers containing minor amounts of copolymerized $C_3$–$C_{12}$-monoalkenes, in particular $C_3$–$C_8$-α-monoalkenes by polymerization of the monomer or monomers at from 30° to 150° C., in particular from 60° to 120° C., under from 2 to 150, in particular from 5 to 60, bar by Phillips catalysis using (1) a supported catalyst consisting of a carrier which is laden with oxidic chromium, oxidic phosphorus and oxidic titanium and (2) a cocatalyst, the supported catalyst (1) being obtained by a procedure in which (1.1) in a first stage, a catalyst intermediate (1.1) laden with the desired amounts of chromium, phosphorus and titanium is prepared from (1.1.a) a finely divided, porous silicate carrier,
(1.1.b) a selected, specific chromium compound,
(1.1.c) a selected, specific phosphorus compound and
(1.1.d) a selected, specific titanium compound, and then (1.2) in a second stage, the catalyst intermediate (1.1) obtained from the first stage is kept in an anhydrous gas stream containing oxygen in a concentration of more than 10% by volume for from 10 to 1000, in particular from 60 to 300, minutes at from 300° to 900° C., in particular from 400° to 600° C. (i.e. calcined or activated) and thus converted to the actual supported catalyst (1).

Polymerization processes of this type are known, and those described in U.S. Pat. Nos. 4,328,124 and 4,404,340 may be considered as typical examples in the present context.

A characteristic feature of this process is that supported catalysts are used which are prepared by a procedure in which, in the first stage, i.e. to obtain the catalyst intermediate, an intermediate obtained in a first substage from a selected phosphorus compound and a selected titanium compound is reacted with a selected chromium compound in a solvent in a second substage and the carrier is then laden with the resulting reaction product.

Other processes which may be considered noteworthy in the present context are, for example, the polymerization processes of a related but different type which are described in U.S. Pat. Nos. 3,984,351 and 3,985,676.

An essential feature of this process is that supported catalysts are used in which introduction of a phosphorous component is effected by combining a carrier with the reaction product of a selected chromium compound and a selected phosphorus compound in order to prepare the catalyst intermediate.

Finally, other polymerization processes, likewise of a related but different type, are also of interest in the present context, typical processes being described in, for example, British patent No. 1,391,771 and U.S. Pat. No. 4,368,302.

A significant feature of this process is that the supported catalysts used are based on a catalyst intermediate which is obtained by combining a carrier already laden with the chromium component with a titanium compound.

The polymerization processes discussed above are based on a special form of Phillips catalysis, i.e. one which employs a supported catalyst which contains not only oxidic chromium but also oxidic phosphorus and/or oxidic titanium, the presence of the latter resulting in polymers which have a broader molecular weight distribution and/or a higher melt flow index, i.e. polymers which, because of their good processability, are preferred for certain fields of use, e.g. the blow molding process.

Although the known polymerization processes of the type under discussion give polymers having a broader molecular weight distribution and/or a higher melt flow index, the productivity of the said processes is unsatisfactory, i.e. the yield of polymer per unit weight of supported catalyst used is unsatisfactory, and/or polymers having unsatisfactory morphological properties, for example a high content of dust-like particles, are formed.

It is an object of the present invention to provide a process of the type defined at the outset which has the above disadvantages to a substantially reduced extent, if at all.

We have found that this object is achieved if, in the polymerization process under discussion, (1) a supported catalyst is used which is obtained (using specific methods and substances in each case) by a procedure in which, (1.1) in a first stage, (1.1.1) a suspension is first prepared from (1.1.1.1) a finely divided silicate carrier and (1.1.1.2) an inert organic solvent, (1.1.2) a suspension is then prepared from (1.1.2.1) chromium trioxide and (1.1.2.2) an inert organic solvent, (1.1.3) thereafter (1.1.3.1) the suspension resulting from (1.1.2) is combined with (1.1.3.2) a phosphorus compound of the formula $P(O)(OR)_3$ or $P(O)H(OR)_2$, where R is alkyl, aryl, cycloalkyl or hydrogen, with the proviso that one or more radicals R are not hydrogen, (1.1.4) thereafter (1.1.4.1) the suspension resulting from (1.1.1) is combined with (1.1.4.2) the reaction product obtained from (1.1.3), (1.1.5) thereafter (1.1.5.1) the suspension formed in (1.1.4) is combined with (1.1.5.2) a titanium compound of the formula $Ti(OR^1)_4$, where $R^1$ is alkyl, aryl or cycloalkyl, and (1.1.6) finally, the suspension obtained in (1.1.5) is evaporated to dryness, after which (1.2) in the second stage, first (1.2.1) the catalyst intermediate obtained from the first stage (1.1) is treated with a stream of nitrogen, then (1.2.2) the intermediate obtained from (1.2.1) is heated in an oxygen-containing gas stream, and finally (1.2.3) the intermediate obtained from (1.2.2) is treated with a stream of nitrogen, and (2) a lithiumalkyl is used as a cocatalyst.

The present invention accordingly relates to a process for the preparation of ethene homopolymers and ethene copolymers containing minor amounts of copolymerized $C_3$–$C_{12}$-α-monoalkenes, in particular $C_3$–$C_8$-α-monoalkenes by polymerization of the monomer or monomers at from 30° to 150° C., in particular from 60° to 120° C., under from 2 to 150, in particular from 5 to 60, bar by Phillips catalysis using (1) a supported catalyst consisting of a carrier which is laden with oxidic chromium, oxidic phosphorus and oxidic titanium and (2) a cocatalyst, the supported catalyst (1) being obtained by a procedure in which (1.1) in a first stage, a catalyst intermediate (1.1) laden with the desired amounts of chromium, phosphorus and titanium is prepared from (1.1.a) a finely divided, porous silicate carrier,
(1.1.b) a selected, specific chromium compound,
(1.1.c) a selected, specific phosphorus compound and (1.1.d) a selected, specific titanium compound, and then (1.2) in a second stage, the catalyst intermediate (1.1) obtained from the first stage is kept in an anhydrous gas stream containing oxygen in a concentration of more than 10% by volume for from 10 to 1000, in particular from 60 to 300, minutes at from 300° to 900° C., in particular from 400° to 600° C. (i.e. calcined or activated) and thus converted to the actual supported catalyst (1).

In the process according to the invention, (1) a supported catalyst is used which is obtained by a procedure in which (1.1) in a first stage, a catalyst intermediate is produced by a method in which first (1.1.1) in a first substage, a suspension is prepared from (1.1.1.1) a finely divided, porous, silicate carrier which has a particle diameter of from 1 to 400 μm, preferably from 10 to 200 μm, a pore volume of from 0.5 to 3, preferably from 1 to 2.5 cm$^3$/g and a specific surface area of from 100 to 1000, preferably from 200 to 700, m$^2$/g and (1.1.1.2) an inert organic solvent, preferably a liquid aliphatic, cycloaliphatic or aromatic chlorohydrocarbon, in particular a $C_1$–$C_3$-chloroalkane which has 2 to 4 chlorine atoms, with thorough mixing, with the proviso that from 150 to 5000, preferably from 200 to 1000, parts by weight of the solvent (1.1.1.2) are used per 100 parts by weight of the carrier (1.1.1.1), then (1.1.2) in a second substage, a suspension is prepared from (1.1.2.1) a finely divided chromium trioxide ($CrO_3$) having a particle diameter of less than 2000 μm, preferably less than 500 μm and (1.1.2.2) a solvent of the type defined under (1.1.1.2), with thorough mixing, with the proviso that more than 1, preferably from 20 to 200, parts by weight of the solvent (1.1.2.2) are used per part by weight of the chromium trioxide (1.1.2.1), thereafter (1.1.3) in a third substage, (1.1.3.1) the suspension resulting from (1.1.2) is combined with (1.1.3.2) a phosphorus compound of the formula P(O)(OR)$_3$ or P(O)H(OR)$_2$, where R is an alkyl, aryl or cycloalkyl group which is of not more than 12, preferably not more than 6, carbon atoms or hydrogen, in particular $C_2$–$C_4$-alkyl or hydrogen, with the proviso that 1 or more radicals R are not hydrogen, with further thorough mixing at from 0° to 60° C., preferably from 10° to 30° C., with the proviso that from 0.6 to 10, preferably from 0.6 to 3, parts by weight of phosphorus from the phosphorus compound (1.1.3.2) are present per part by weight of chromium from the chromium trioxide (1.1.2.1), and the entire mixture is kept at the stated temperature for from 5 to 300, preferably from 20 to 60, minutes, thereafter (1.1.4) in a fourth substage, (1.1.4.1) the suspension resulting from (1.1.1) is combined with (1.1.4.2) the reaction product obtained in substage (1.1.3) with thorough mixing at from 0° to 60° C., preferably from 10° to 30° C., with the proviso that from 0.1 to 5, preferably from 0.5 to 2, parts by weight of chromium from the chromium trioxide (1.1.2.1) are present per 100 parts by weight of the carrier (1.1.1.1), and the entire mixture is kept at the stated temperature for from 5 to 300, preferably from 20 to 60, minutes, then (1.1.5) in a fifth substage, (1.1.5.1) the suspension formed in substage (1.1.4) is combined with (1.1.5.2) a titanium compound of the formula Ti(OR$^1$)$_4$, where R$^1$ is an alkyl, aryl or cycloalkyl group of not more than 12 carbon atoms, preferably $C_2$–$C_4$-alkyl, in particular isopropyl, with further thorough mixing at from 0° to 60° C., preferably from 10° to 30° C., with the proviso that from 0.1 to 10, preferably from 1 to 6, parts by weight of titanium from the titanium compound (1.1.5.2) are present per 100 parts by weight of the carrier (1.1.1.1), and the entire mixture is kept at the stated temperature for from 5 to 300, preferably from 20 to 60, minutes, and finally, (1.1.6) in a sixth substage, the suspension obtained in substage (1.1.5) is evaporated to dryness at not more than 150° C., preferably not more than 80° C., under atmospheric or reduced pressure, and then (1.2) in a second stage, the catalyst intermediate obtained in the first stage (1.1) is converted to the actual supported catalyst by a procedure in which first (1.2.1) in a first substage, the catalyst intermediate obtained in the first stage (1.1) is kept in an anhydrous stream of nitrogen for from 60 to 500, in particular from 100 to 300, minutes at from 150° to 300° C., in particular from 200° to 270° C., thereafter (1.2.2) in a second substage, the intermediate obtained in substage (1.2.1) is kept in an anhydrous gas stream containing oxygen in a concentration of more than 10% by volume for from 10 to 1000, in particular from 60 to 300, minutes at from 300° to 900° C., in particular from 400° to 600° C., and finally (1.2.3) in a third substage, the intermediate obtained in substage (1.2.2) is kept in an anhydrous stream of nitrogen for from 10 to 300, in particular from 30 to 150, minutes at from 50° to 400° C., in particular from 100° to 270° C., and (2) a lithiumalkyl of the formula LiR$^2$, where R$^2$ is $C_1$–$C_{12}$-alkyl, in particular $C_2$–$C_4$-alkyl, is used as a cocatalyst, with the proviso that the atomic ratio of chromium in the supported catalyst (1) to lithium in the cocatalyst (2) is greater than 1:100, in particular from 1:1 to 1:20.

Regarding the overall aspects of the novel polymerization process, the following may be stated specifically.

Provided that the special feature according to the invention is taken into account, the polymerization process as such can be carried out in virtually any relevant conventional technological form, for example as a batchwise, periodic or continuous suspension or dry-phase polymerization process in a stirred or fluidized bed. The stated technological forms, i.e. the technological versions of the polymerization of olefins by the Phillips method, are well known from the literature and in practice, so that further description is unnecessary here.

It should also be emphasized that the novel procedure is preferably carried out as a process for the continuous preparation of particulate homopolymers or copolymers by polymerization of the monomer or monomers in a liquid $C_4$- or $C_5$-alkane as a reaction medium, in which the monomer or monomer mixture to be polymerized is present in dissolved form and the resulting particulate polymer in suspended form, in the presence or absence of an antistatic as an antifouling agent and in the presence or absence of hydrogen as a molecular weight regulator, with circulation of the reaction mixture, the starting materials being added to the said circulation and the resulting particulate polymer being removed from it. Polymerization processes of this type, are e.g. processes for the preparation of homopolymers and copolymers of ethylene by suspension polymerization of the monomer or monomers in a liquid alkane are known in a wide variety of forms; in the present context, reference may be made, by way of example, to the procedures described in British patents Nos. 841,263 and 1,435,965 and U.S. Pat. Nos. 3,242,150 and 4,007,321.

It should also be noted that the novel supported catalyst (1), like corresponding known catalysts, can be combined with the cocatalyst (2) outside or inside the polymerization space, in the latter case, for example, by feeding in the components at different points, the components otherwise being handled in the form of a suspension (catalyst) or solution (cocatalyst).

Finally, it should also be stated that the novel polymerization process is useful mainly for the preparation of ethene homopolymers and ethene copolymers (the latter in particular with propene, but-1-ene, hex-1-ene, 4-methylpent-1-ene or oct-1-ene) which have a high melt flow index and a broad molecular weight distribution coupled with a low content of finely divided polymer, in particular a polymer having a particle diameter of less than 125 $\mu$m (i.e. polymers as are preferably used in, for example, the blow molding process, good productivity, i.e. a high yield of polymer per unit weight of supported catalyst used, furthermore being achieved.

Regarding the novel supported catalysts (1) themselves, which are employed according to the invention, the following may be stated.

It is prepared in two stages which are denoted above and below by (1.1) and (1.2).

In the first stage (1.1), the catalyst intermediate is prepared in six substages (1.1.1), (1.1.2), (1.1.3), (1.1.4), (1.1.5) and (1.1.6), which can be carried out readily by the skilled worker, without difficulties. It is advantageous to use an apparatus which permits continuous, very homogeneous mixing of the particular mixtures under an inert protective atmosphere, such as a nitrogen atmosphere. It is also advantageous, in substages (1.1.3), (1.1.4) and (1.1.5), if the phosphorus compound (1.1.3.2), the reaction product (1.1.4.2) and the titanium compound (1.1.5.2) are introduced gradually rather than abruptly into the particular suspension (1.1.3.1), (1.1.4.1) and (1.1.5.1) respectively. Finally, the evaporation process in substage (1.1.6) is carried out under mild conditions, for example a rotary evaporater being suitable for this purpose.

In the second stage (1.2), the catalyst intermediate obtained in the first stage (1.1) is converted to the actual supported catalyst in the course of three substages (1.2.1), (1.2.2) and (1.2.3). These process steps too can be readily carried out by the skilled worker, without difficulties. The apparatuses and methods advantageously used for this purpose are those which are well known and conventionally employed for calcining or activating Phillips supported catalysts. This means that, in the second substage (1.2.2), the conditions chosen must ensure that some or all of the chromium in the ready-prepared supported catalyst is in the hexavalent state; to this extent, there is therefore no special feature here in comparison with the prior art. The novel special features of the second stage (1.2) are associated more with the preceding substage (1.2.1) and the subsequent substage (1.2.3), without which the aim according to the invention could not be achieved. In connection with the lastmentioned substage (1.2.3), it should be noted that it is advantageously associated with the cooling process during the stated critical time and in the stage critical temperature range, this being done not out of necessity but for economic reasons.

Regarding the composition of the novel supported catalyst (1), it should be stated that, in general, water should as far as possible be excluded during its preparation. This begins with the carrier (1.1.1.1), which, before being used, should be dried at elevated temperatures, as is usual in relevant cases, for example for 8 hours at 140° C. under 20 mmHg. The inert organic solvent (1.1.1.2) likewise to be used should contain as far as possible less than 0.1% by weight of water, particularly suitable solvents here being chlorohydrocarbons, particularly dichloromethane, but also, for example, trichloromethane, carbon tetrachloride and trichloroethene. The water content of the chromium trioxide (1.1.2.1) should not exceed 1% by weight. Particularly suitable phosphorus compounds (1.1.3.2), which likewise contain no more than 1% by weight by water, are diethyl phosphite, dibutyl phosphite, diethyl phosphate and di-n-butyl phosphate, but, for example, dimethyl phosphite, diisopropyl phosphite, diphenyl phosphite, diphenyl phosphate, trimethyl phosphate and triphenyl phosphate are also useful. The titanium compound (1.1.5.2) finally to be used is relatively highly sensitive to hydrolysis; for this reason per se, it contains no more than minimum amounts of water. Titanium compounds suitable for the purpose according to the invention are, in addition to the particularly preferred titanium(IV) tetraisopropylate, for example, titanium(IV) tetraethylate, titanium(IV) tetra-n-propylate and titanium(IV) tetra-n-butylate.

In the novel polymerization process, it is necessary to use not only a supported catalyst (1) but also a cocatalyst (2) in the form of a particular lithiumalkyl. Specific examples of particularly suitable relevant cocatalysts are n-butyllithium, sec-butyllithium and tertbutyllithium; however, other suitable alkyllithiums are, for example, ethyllithium, n-propyllithium and isopropyllithium.

EXAMPLE

The preparation of the supported catalyst (1)

(1.1) in a first stage, a catalyst intermediate is prepared by a procedure in which first (1.1.1) in a first substage a suspension is prepared from (1.1.1.1) a finely divided, porous silicate carrier which has a particle diameter of from 30 to 100 $\mu$m, a pore volume of 1.75 cm$^3$/g and a specific surface area of 320 m$^2$/g (dried for 8 hours at 140° C. under 20 mmHg) and (1.1.1.2) anhydrous dichloromethane under an argon atmosphere and with thorough mixing by stirring, with the proviso that 400 parts by weight of the organic solvent (1.1.1.2) are used per 100 parts by weight of the carrier (1.1.1.1), then (1.1.2) in a second substage, a suspension is prepared from (1.1.2.1) a finely divided chromium trioxide (CrO$_3$) having a particle diameter of less than 500 $\mu$m and (1.1.2.2) the solvent of the type stated under (1.1.1.2) with thorough stirring, with the proviso that 50 parts by weight of the solvent (1.1.2.2) are used per part by weight of the chromium trioxide (1.1.2.1), thereafter (1.1.3) in a third substage (1.1.3.1) the suspension resulting from (1.1.2) is combined with (1.1.3.2) a phosphorus compound of the formula P(O)H(OR)$_3$, where R is ethyl, with further thorough mixing at 20° C., with a proviso that 1 part by weight of phosphorus from the phosphorus compound (1.1.3.2) is present per part by weight of chromium from the chromium trioxide (1.1.2.1), and the entire mixture is kept at the stated temperature for 30 minutes, thereafter (1.1.4) in a fourth substage, (1.1.4.1) the suspension resulting from (1.1.1) is combined with (1.1.4.2) the reaction product obtained in substage (1.1.3) with thorough mixing at 20° C., with the proviso that 1 part by weight of chromium from the chromium trioxide (1.1.2.1) is present per 100 parts by weight of the carrier (1.1.1.1), and the entire mixture is kept at the stated temperature for 30 minutes, then (1.1.5) in a fifth substage, (1.1.5.1) the suspension formed in substage (1.1.4) is combined with (1.1.5.2) a titanium compound of the formula Ti(OR$^1$)$_4$, where R$^1$ is isopropyl, with further thorough mixing at 20° C., with the proviso that 4 parts by weight of titanium from the titanium compound (1.1.5.2) are present per 100 parts by weight of the carrier (1.1.1.1), and the entire mixture is kept at the stated temperature for 30 minutes, and finally (1.1.6) in a sixth substage, the suspension obtained in substage (1.1.5) is evaporated to dryness at up to 80° C. under reduced pressure (up to 20 mmHg) in a rotary evaporator.

(1.2) In a second stage, the catalyst intermediate obtained in the first stage (1.1) is converted to the actual supported catalyst by a method in which, using a fluidized bed in each case, first, (1.2.1) in a first substage, the catalyst intermediate obtained in the first stage (1.1) is kept at 250° C. for 120 minutes in an anhydrous stream of nitrogen, then (1.2.2) in a second substage, the intermediate obtained in substage (1.2.1) is kept at 500° C. for 60 minutes in an anhydrous stream of air, and finally (1.2.3) in a third substage, the intermediate obtained in substage (1.2.2) is kept for 60 minutes at a temperature decreasing from 250° to 100° C., in an anhydrous stream of nitrogen.

Polymerization using the supported catalyst (1) and the cocatalyst (2)

A steel autoclave which has a useful volume of 1 liter and is equipped with a stirrer is heated to 95° C. and flushed for 10 minutes with dry nitrogen. Thereafter, 1 ml of a solution containing 10 g of n-butyllithium as cocatalyst (2) per 1 of n-heptane and 500 ml of isobutane are introduced into the reactor. By feeding in ethene, the pressure is then increased to 40 bar and, after 80 mg of the supported catalyst (1) have been introduced with the aid of a lock, the amounts introduced corresponding to an atomic ratio of chromium in the supported catalyst to lithium in the cocatalyst of 1:10, the pressure is maintained during polymerization. After 60 minutes at a polymerization temperature of 95°±2° C., the autoclave is let down with evaporation of the isobutene and of the unconverted ethene, and the resulting polymer is removed.

Further data on the resulting product is given in the Table below.

COMPARATIVE EXPERIMENT 1

The procedure followed is the same as that described in the Example, with the exception that, in the preparation of the supported catalyst (1) in the course of the first stage (1.1), (1.1.3) in the third substage, (1.1.3.2) instead of a phosphorus compound of the formula P(O)H(OR)$_3$, where R is ethyl, the reaction product formed in a separate substage by combining a phosphorus compound of the formula P(P)OH(OR)$_2$, where R is butyl, with a titanium compound of the formula Ti(OR$^1$)$_4$, where R$^1$ is isopropyl, in anhydrous dichloromethane with thorough mixing at 20° C., with the proviso that 1 mole of phosphorus from the phosphorus compound and 1 mole of titanium from the titanium compound are present per mole of chromium from the chromium trioxide (1.1.2.1), and (1.1.5) the fifth substage is omitted.

Further data on the resulting product are likewise given in the Table.

COMPARATIVE EXPERIMENT 2

The procedure followed is once again the same as that described in the Example, with the exception that, in the preparation of the supported catalyst (1) in the course of the first stage (1.1), (1.1.5) the fifth substage is omitted.

Further data on the resulting product are likewise given in the Table.

COMPARATIVE EXPERIMENT 3

The procedure followed is likewise the same as that described in the Example, with the exception that, in the preparation of the supported catalyst (1) in the course of the first stage (1.1), (1.1.1) in the first substage, (1.1.1.1) instead of the silicate carrier, a finely divded porous silicate carrier which contains 1% by weight of chromium as chromium trioxide and is available under the trade name 969 MS from Grace GmbH (dried for 8 hours at 140° C. under 20 mmHg) is used, and (1.1.1.2) instead of the anhydrous dichloromethane, anhydrous n-heptane is used, and (1.1.2) the second substage, (1.1.3) the third substage and (1.1.4) the fourth substage are omitted.

Further data on the resulting product are once again given in the Table below.

TABLE

| | Productivity[a] (gPE/gCat.) | HLMI[b] (g/10 min) | Mw/Mn[c] | <125 μm[d] % |
|---|---|---|---|---|
| Example | 3900 | 6.0 | 32.3 | 0.2 |
| Comparative Experiment 1 | 1800 | <0.5 | n.d.[x] | 0.2 |
| Comparative Experiment 2 | 1500 | <0.5 | n.d.[x] | 0.1 |
| Comparative Experiment 3 | 2600 | 6.0 | 32.0 | 3.2 |

[a] g of polymer per g of supported catalyst (1).
[b] According to DIN 53,735 at 190° C./21.6 kp.
[c] Quotient of weight average and number average molecular weights (Mw/Mn) determined by gel permeation chromatography. (High values for Mw/Mn correspond to a broad molecular weight distribution, and vice versa).
[d] Particle diameter of the polymer according to sieve analysis.
[x] n.d. = not determinable.

We claim:

1. A process for the preparation of ethene homopolymers and ethene copolymers containing minor amounts of copolymerized $C_3$–$C_{12}$-α-monoalkenes, by polymerization of the monomer or monomers at from 30° to 150° C., under pressure from 2 to 150, bar by Phillips catalysis using (1) a supported catalyst consisting of a carrier which is laden with oxidic chromium, oxidic phosphorus and oxidic titanium and (2) a cocatalyst, the supported catalyst (1) being obtained by a procedure in which (1.1) in a first stage, a catalyst intermediate (1.1) laden with the desired amounts of chromium, phosphorus and titanium is prepared from
(1.1.a) a finely divided, porous silicate carrier,
(1.1.b) a selected, specific chromium compound,
(1.1.c) a selected, specific phosphorus compound and
(1.1.d) a selected, specific titanium compound, and then
(1.2) in a second stage, the catalyst intermediate (1.1) obtained from the first stage is kept in an anhydrous gas stream containing oxygen in a concentration of more than 10% by volume for from 10 to 1000 minutes at from 300° to 900° C., thus converted to the actual supported catalyst (1), wherein
(1) a supported catalyst is used which is obtained by a procedure in which
(1.1) in a first stage, a catalyst intermediate is produced by a method in which first
(1.1.1) in a first substage, a suspension is prepared from
(1.1.1.1) a finely divided, porous, silicate carrier which has a particle diameter of from 1 to 400 μm, a pore volume of from 0.5 to 3 cm$^3$/g and a specific surface area of from 100 to 1000m$^2$/g and
(1.1.1.2) an inert organic solvent, with thorough mixing, with the proviso that from 150 to 5000 parts by weight of the solvent (1.1.1.2) are used per 100 parts by weight of the carrier (1.1.1.1), then
(1.1.2) in a second substage, a suspension is prepared from
(1.1.2.1) a finely divided chromium trioxide (CrO$_3$) having a particle diameter of less than 2000 μm, and
(1.1.2.2) a solvent of the type defined under (1.1.1.2), with thorough mixing, with the proviso that more than 1 part by weight of the solvent (1.1.2.2) are used per part by weight of the chromium trioxide (1.1.2.1), thereafter
(1.1.3) in a third substage,
(1.1.3.1) the suspension resulting from (1.1.2) is combined with
(1.1.3.2) a phosphorus compound of the formula P(O)(OR)$_3$ or P(O)H(OR)$_2$, where R is an alkyl, aryl or cycloalkyl group of not more than 12 carbon atoms or hydrogen with the proviso that 1 or more radicals R must not be hydrogen, with further thorough mixing at from 0° to 60° C. with the proviso that from 0.6 to 10 parts by weight of phosphorus from the phosphorus compound (1.1.3.2) are present per part by weight of chromium from the chromium trioxide (1.1.2.1), and the entire mixture is kept for the stated temperature for from 5 to 300 minutes, thereafter
(1.1.4) in a fourth substage,
(1.1.4.1) the suspension resulting from (1.1.1) is combined with
(1.1.4.2) the reaction product obtained in substage (1.1.3) with thorough mixing at from 0° to 60° C.
with the proviso that from 0.1 to 5 parts by weight of chromium from the chromium trioxide (1.1.2.1) are present per 100 parts by weight of the carrier (1.1.1.1), and the entire mixture is kept at the stated temperature for from 5 to 300 minutes, then
(1.1.5) in a fifth substage,
(1.1.5.1) the suspension formed in substage (1.1.4) is combined with
(1.1.5.2) a titanium compound of the formula Ti(OR$^1$)$_4$, where R$^1$ is an alkyl, aryl or cycloalkyl group of not more than 12 carbon atoms, with further thorough mixing at from 0° to 60° C. with the proviso that from 0.1 to 10 parts by weight of titanium from the titanium compound (1.1.5.2) are present per 100 parts by weight of the carrier (1.1.1.1), and the entire mixture is kept at the stated temperature for from 5 to 300 minutes, and finally
(1.1.6) in a sixth substage, the suspension obtained in substage (1.1.5) is evaporated to dryness at not more than 150° C. under atmospheric or reduced pressure, and then
(1.2) in a second stage, the catalyst intermediate obtained in the first stage (1.1) is converted to the actual supported catalyst by a procedure in which first
(1.2.1) in a first substage, the catalyst intermediate obtained in the first stage (1.1) is kept in an anhydrous stream of nitrogen for from 60 to 500 minutes at from 150° to 300° C., thereafter
(1.2.2) in a second substage, the intermediate obtained in substage (1.2.1) is kept in an anhydrous gas stream containing oxygen in a concentration of more than 10% by volume for from 10 to 1000 minutes at from 300° to 900° C., and finally
(1.2.3) in a third substage, the intermediate obtained in substage (1.2.2) is kept in an anhydrous stream of nitrogen for from 10 to 300 minutes at from 50° to 400° C., and
(2) a lithiumalkyl of the formula LiR$^2$, where R$^2$ is $C_1$–$C_{12}$-alkyl is used as a cocatalyst, with the proviso that the atomic ratio of chromium in the supported catalyst (1) to lithium in the cocatalyst (2) is greater than 1:100.

2. A supported catalyst (1) for Phillips catalysis, consisting of a carrier which is laden with oxidic chromium, oxidic phosphorus and oxidic titanium, and obtained by a procedure in which
(1.1) in a first stage, a catalyst intermediate (1.1) laden with the desired amounts of chromium, phosphorus and titanium is prepared from
(1.1.a) a finely divided, porous silicate carrier,
(1.1.b) a selected, specific chromium compound,
(1.1.c) a selected, specific phosphorus compound and
(1.1.d) a selected, specific titanium compound, and then
(1.2) in a second stage, the catalyst intermediate (1.1) obtained from the first stage is kept in an anhydrous gas stream containing oxygen in a concentration of more than 10% by volume for from 10 to 1000 minutes at from 300° to 900° C., thus converted to the actual supported catalyst (1), wherein the supported catalyst is obtained by a method in which
(1.1) in a first stage, a catalyst intermediate is produced by a method in which first
(1.1.1) in a first substage, a suspension is prepared from
(1.1.1.1) a finely divided, porous, silicate carrier which has a particle diameter of from 1 to 400 μm, a pore volume of from 0.5 to 3 cm$^3$/g and a specific surface area of from 100 to 1000 m$^2$/g and (1.1.1.2) an inert organic solvent, with thorough mixing, with the proviso that from 150 to 5000 parts by weight of the solvent (1.1.1.2) are used per 100 parts by weight of the carrier (1.1.1.1), then (1.1.2) in a second substage, a suspension is prepared from (1.1.2.1) a finely divided chromium trioxide (CrO$_3$) having a particle diameter of less than 2000 μm, and (1.1.2.2) a solvent of the type defined under (1.1.1.2), with thorough mixing, with the proviso that more than 1 part by weight of the solvent (1.1.2.2) are used per part by weight of the chromium trioxide (1.1.2.1), thereafter (1.1.3) in a third substage, (1.1.3.1) the suspension resulting from (1.1.2) is combined with (1.1.3.2) a phosphorus compound of the formula P(O)(OR)$_3$ or P(O)H(OR)$_2$, where R is an alkyl, aryl or cycloalkyl group of not more than 12 carbon atoms or hydrogen with the proviso that 1 or more radicals R must not be hydrogen, with further thorough mixing at from 0° to 60° C. with the proviso that from 0.6 to 10 parts by weight of phosphorus from the phosphorus compound (1.1.3.2) are present per part by weight of chromium from the chromium trioxide (1.1.2.1), and the entire mixture is kept at the stated temperature for from 5 to 300 minutes, thereafter (1.1.4) in a fourth substage, (1.1.4.1) the suspension resulting from (1.1.1) is combined with (1.1.4.2) the reaction product obtained in substage (1.1.3). with thorough mixing at from 0° to 60° C. with the proviso that from 0.1 to 5 parts by weight of chromium from the chromium trioxide (1.1.2.1) are present per 100 parts by weight of the carrier (1.1.1.1), and the entire mixture is kept at the stated temperature for from 5 to 300 minutes, then (1.1.5) in a fifth substage, (1.1.5.1) the suspension formed in substage (1.1.4) is combined with (1.1.5.2) a titanium compound of the formula Ti(OR$^1$)$_4$, where R$^1$ is an alkyl, aryl or cycloalkyl group of not more than 12 carbon atoms, with further thorough mixing at from 0° to 60° C. with the proviso that from 0.1 to 10 parts by weight of titanium from the titanium compound (1.1.5.2) are present per 100 parts by weight of the carrier (1.1.1.1), and the entire mixture is kept at the stated temperature for from 5 to 300 minutes, and finally (1.1.6) in a sixth substage, the suspension obtained in substage (1.1.5) is evaporated to dryness at not more than 150° C. under atmospheric or reduced pressure, and then (1.2) in a second stage, the catalyst intermediate obtained in the first stage (1.1) is converted to the actual supported catalyst by a procedure in which first (1.2.1) in a first substage, the catalyst intermediate obtained in the first stage (1.1) is kept in an anhydrous stream of nitrogen for from 60 to 500 minutes at from 150° to 300° C., thereafter (1.2.2) in a second substage, the intermediate obtained in substage (1.2.1) is kept in an anhydrous gas stream containing oxygen in a concentration of more than 10% by volume for from 10 to 1000 minutes at from 300° to 900° C., and finally (1.2.3) in a third substage, the intermediate obtained in substage (1.2.2) is kept in an anhydrous stream of nitrogen for from 10 to 300 minutes at from 50° to 400° C.

* * * * *